UNITED STATES PATENT OFFICE.

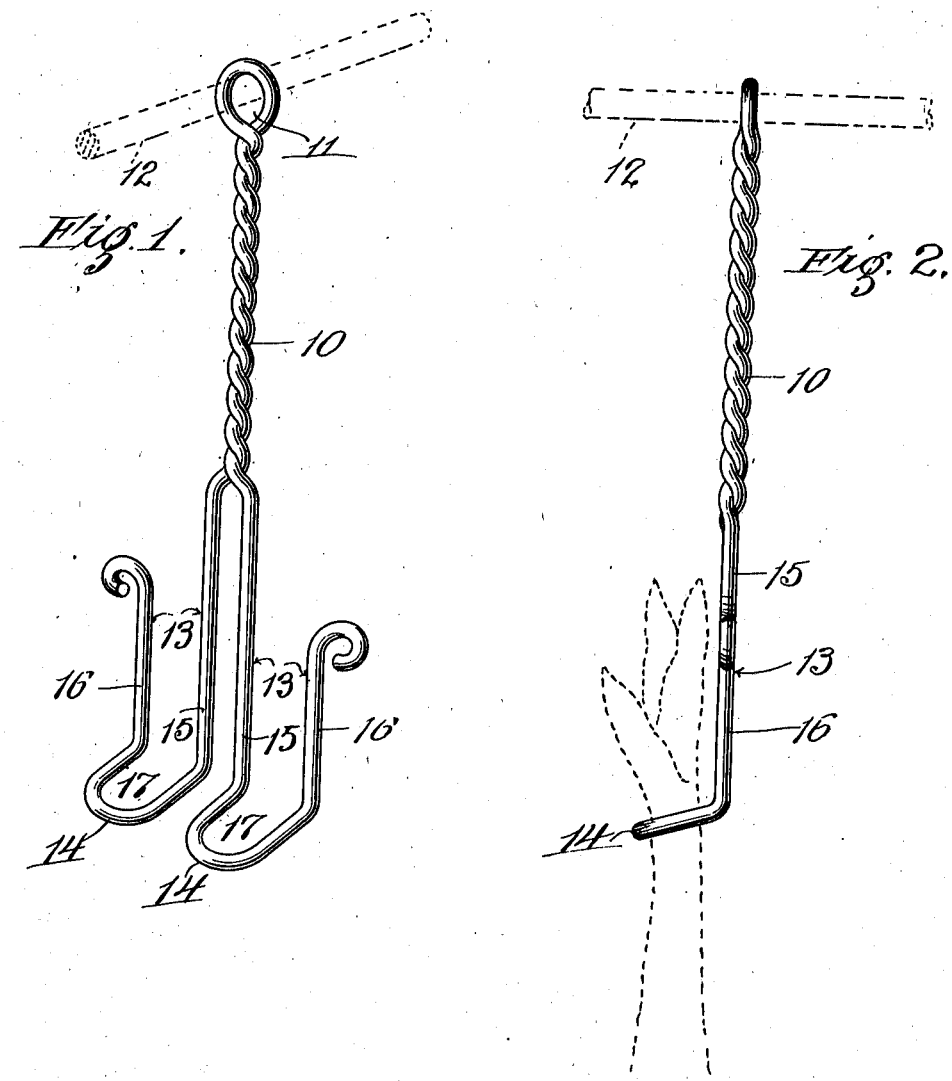

FRANK B. LEWIS, JR., OF WHITING, INDIANA, ASSIGNOR TO POULTRY DUST BATH COMPANY, OF WHITING, INDIANA, A CORPORATION OF INDIANA.

POULTRY-HOOK.

970,840.

Specification of Letters Patent. Patented Sept. 20, 1910.

Application filed March 11, 1910. Serial No. 548,739.

*To all whom it may concern:*

Be it known that I, FRANK B. LEWIS, Jr., a citizen of the United States, residing at Whiting, in the county of Lake and State of Indiana, have invented new and useful improvements in Poultry-Hooks, of which the following is a specification.

This invention relates to that class of hooks adapted for catching or suspending fowls or animals, the object being to provide an improved device of this type from which fowls, such as chickens, turkeys or other birds may be suspended and with which they may be caught.

To such ends the invention consists in certain novel features of construction and arrangement, a description of which will be found in the following specification, and the essential features of which will be more definitely pointed out in the claim.

The invention is clearly illustrated in the accompanying drawing in which:—

Figure 1 is a perspective view of the poultry hook and. Fig. 2 is a side view thereof.

Referring to said drawing, the device will be seen to comprise a shank 10, preferably provided at one end with an eye 11, by means of which it may be suspended in any suitable manner, as for instance, it may be suspended from a piece of wire or rod 12. The lower end of the shank is preferably forked to provide two hook members 13, that have U shaped bends 14, at their lower ends. Each hook member 13, comprises two longitudinally extending arms, 15, 16, which are joined at their lower ends by the U bends 14. The four arms 15, 16, of the hook members are preferably arranged in one plane, and the curved lower ends 14, are bent transversely to the plane of the hook members to provide transverse loops 17, that open out through the spaces between the pairs of arms 15, 16. The terminal ends of the arms 16, are curled around to provide smooth finished ends for the arms 16, and to provide a sort of flaring entrance to the space between the arms of each hook member.

A simple form of construction may comprise a single piece of wire bent at the middle to form the eye, 11, and then twisted together to form the shank after which the two strands of the wire may be separated to form the fork and then bent into the two hook members 13, after which the transverse bends 14, may be made on the hook members and the terminal ends curled in to make the finished ends.

This construction provides, as will be seen, one or more open sided loops, through which may project an article to be supported and the upper edge of said loop forms a seat for engaging any lateral enlargement or projection on said article. The upright arms 15, 16, act to retain said enlargement or projection against lateral movement out through the open side of the loop.

This poultry hook is especially adapted for suspending fowls, when dusting them, or during the killing and bleeding process. In use, the legs of the fowl are drawn in through the flaring openings between the arms 15, 16, of the hook members 13, so as to bring the feet over the loops 17, and the legs, then pushed down into the loops. When the hook is hung up on its support and the fowl allowed to fall, the feet lodge upon the loops and by reason of the closely spaced arms 15, 16, which engage with the upwardly projecting feet, the latter are prevented from lateral movement out through the open sides of the loops. To remove the fowl, the legs are swung or lifted up and drawn upward through the spaces between the arms 15, 16.

By making the shank 10, of convenient length the hook may be used advantageously in catching fowls and the transverse bends in the hook portions minimize the danger of breaking the leg of the fowl when caught. When used to catch the fowl, the transverse bends should be held down so that when the leg is seized by the hook, it will slide into the hook member and against the flat side of the loop. The bend in the loop will then lie underneath the leg, thereby avoiding any bending thereof, as the pull will be against the flat side of the loop.

I claim as new and desire to secure by Letters Patent:

A hook of the class described, comprising a shank having a forked end, each member of the fork being formed with a transversely extending open sided loop, and a member projecting from one end of the loop in a line parallel with the fork.

In witness whereof I have hereunto subscribed my name at Whiting, Lake county, Indiana, this 2nd day of February A. D. 1910.

FRANK B. LEWIS, Jr.

Witnesses:
E. W. WICKEY,
W. E. SCHRUGE.